US006598497B1

United States Patent
Mizushima et al.

(10) Patent No.: US 6,598,497 B1
(45) Date of Patent: Jul. 29, 2003

(54) OPTICAL FIBER CABLE COVER REMOVING DEVICE

(75) Inventors: Toshiro Mizushima, Sakura (JP); Takeshi Sato, Sakura (JP); Taku Otani, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/017,258

(22) Filed: Dec. 13, 2001

(30) Foreign Application Priority Data

Apr. 26, 2001 (JP) ........................................ 2001-130013

(51) Int. Cl.[7] ................................................ H02G 1/12
(52) U.S. Cl. ........................... 81/9.41; 81/9.51; 81/9.42
(58) Field of Search .................... 81/9.4, 9.41, 9.42, 81/9.44

(56) References Cited

U.S. PATENT DOCUMENTS

| | | | | |
|---|---|---|---|---|
| 4,787,144 A | * | 11/1988 | Krampe | 30/90.7 |
| 4,969,703 A | * | 11/1990 | Fyfe et al. | 385/123 |
| 5,090,272 A | * | 2/1992 | Buchmayer | 81/9.41 |
| 5,582,078 A | * | 12/1996 | Talley | 81/9.51 |
| 5,771,573 A | * | 6/1998 | Talley | 29/825 |
| 5,787,768 A | * | 8/1998 | Talley | 81/9.51 |
| 5,893,302 A | * | 4/1999 | Strom | 81/9.51 |
| 6,023,996 A | * | 2/2000 | Dodge et al. | 81/9.51 |
| 6,032,366 A | * | 3/2000 | Tominaga et al. | 30/90.1 |
| 6,052,880 A | * | 4/2000 | Basavanhally | 29/33.5 |
| 6,311,581 B1 | * | 11/2001 | Hsieh | 81/9.51 |
| 6,321,621 B1 | * | 11/2001 | Stepan | 81/9.51 |
| 6,427,557 B1 | * | 8/2002 | Krause | 81/9.51 |
| 6,477,310 B1 | * | 11/2002 | Dumitriu | 385/147 |

FOREIGN PATENT DOCUMENTS

JP          11-023851          1/1999

* cited by examiner

*Primary Examiner*—Joseph J. Hail, III
*Assistant Examiner*—David B. Thomas
(74) *Attorney, Agent, or Firm*—Bell, Boyd & Lloyd LLC (57) ABSTRACT

An optical fiber cable covering removing device which can remove the covering layer of an optical fiber reliably and safely comprises a support member, a fiber holder, a fiber holder retainer which can move the fiber holder toward and away from the support member along the longitudinal direction of the optical fiber. The support member is provided with a cutter holder fixing structure which fixes cutter holders in closed position. The cutter holder fixing structure is disposed so as to be able to impart force to the first cable covering removing cutter and the second cable covering removing cutter formed on the cutter holder in parallel. The fiber holder retainer is provided with a fiber holder fixing structure which fixes the fiber holder in a closed position. The fiber holder fixing structure is disposed near the center of the fiber holder.

6 Claims, 6 Drawing Sheets

OPTICAL FIBER CABLE COVER REMOVING DEVICE

BACKGROUND OF THE INVENTION

1. Field of the Invention

This invention relates to an optical fiber cable cover removing device which removes the covering layer of an optical fiber cable.

2. Description of Related Art

Conventionally, an optical fiber has been cut at a predetermined position for use so that the optical fiber can be abutted and joined to other optical fiber and devices. In the case in which the optical fiber is cut, the covering layer must be removed in order to expose a bare fiber. In order to remove the covering layer of an optical fiber, an optical fiber cable covering removing device which removes the cable covering layer of the optical fiber in one operation is used frequently.

Figure 8:
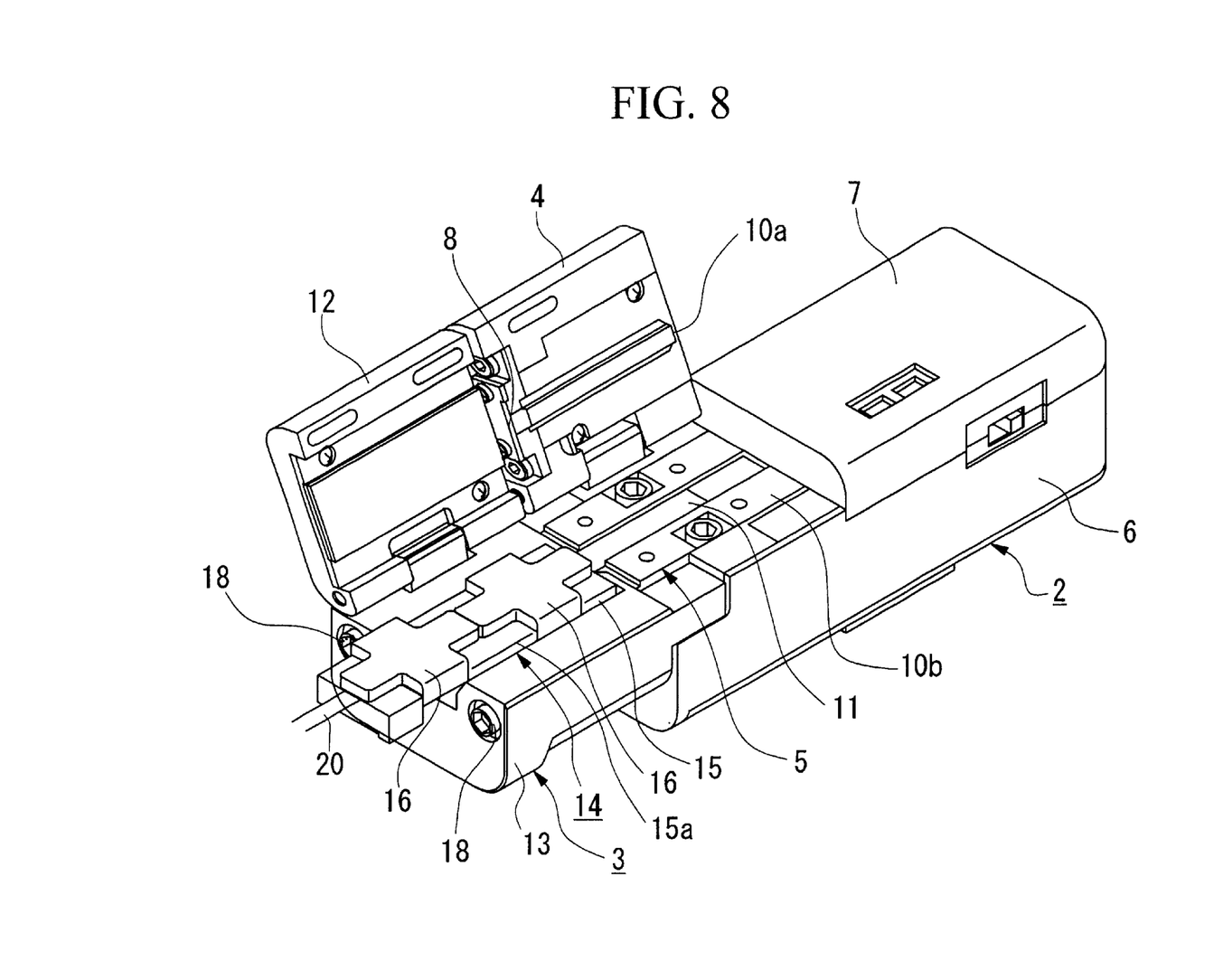
FIG. 8 is an exploded view showing an example of a conventional optical fiber cable covering removing device.
Figure 9:
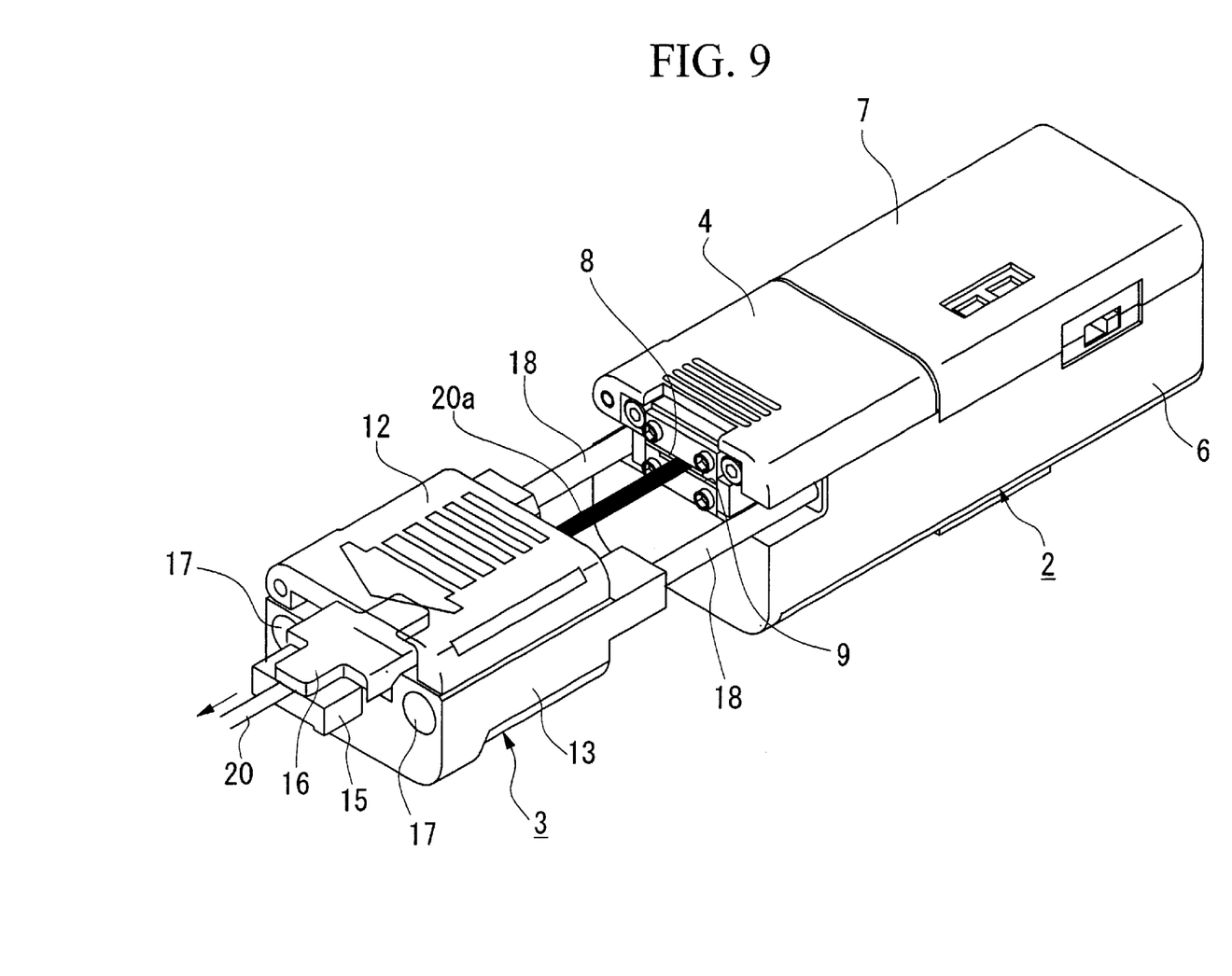
FIG. 9 is an exploded view showing an example of a conventional optical fiber cable covering removing device.

FIGS. 8 and 9 are exploded views showing an example of conventional optical fiber cable covering removing device. An optical fiber cable covering removing device in this example comprises a support member 2 and a fiber holder retainer 3.

The support member 2 comprises a main body 6 having a pair of freely opening and closing cutter holders 4 and 5 attached together by hinge, and a lid 7. One cutter holder 4 comprises a first cable covering removing cutter 8 which removes the cable covering layer of the optical fiber, and a tip retaining section 10a which retains the tip of the optical fiber 20. The other cutter holder 5 comprises a second cable covering removing cutter 9 and a tip retaining section 10b on which a guide groove 11 which retains the tip of the optical fiber 20 is formed. Also, in the guide groove 11 of the tip retaining sections 10a and 10b, a heating plate (not shown in the drawing) and a heating device (not shown in the drawing) are embedded. The heating device heats the covering layer of the optical fiber 20 positioned by means of the guide groove 11 of the tip retaining section 10a and 10b via the heating plate, to a temperature at which temperature the cable cover does not melt. Here, the optical fiber 20 is made of a bare fiber 20a and a covering layer which is formed around the bare fiber 20a.

A fiber holder retainer 3 comprises a retainer upper member 12 and a retainer lower member 13 attached together by a hinge so as to be openable and closeable. On the retainer lower member 13, a base stand 15 and a fiber holder 14 having two opening and closing plate members 16 and 16 attached together by a hinge so as to be openable and closeable are fit against the upper surface 15a of this base stand 15.

Also, the support member 2 and the fiber holder retainer 3 are connected via fitting holes 17 and 17 and guide bars 18 and 18. On both longitudinal sides of the retainer lower member 13, the fitting holes 17 and 17 are formed in parallel with the longitudinal direction. The fitting holes 17 and 17 lead to fitting holes (not shown in the drawing) formed on both sides of the longitudinal direction of a main body 6 of the support member 2. Also, the fitting holes 17 and 17 lead to the fitting holes of the main body 6, and then the guide bars 18 and 18 extending from this fitting hole are inserted in the fitting holes 17 and 17. Also, the guide bars 18 and 18 are fitted to the fitting holes 17 and 17, in such a way that the fiber holder retainer 3 can be moved by external force such as manual manipulation by an operator, and the positioning can be fixed when external force stops. In the removal of the covering layer of the optical fiber 20 in which the optical fiber cable cover removing device of this example is used, first, the optical fiber 20 is mounted on the base stand 15 in condition that the opening and closing members 16 and 16 of the fiber holder 14 are opened against the base stand 15, and then the optical fiber 20 is retained by the fiber holder 14 by closing the opening and closing member 16 and 16 and the retainer upper member 12.

Next, the optical fiber 20 is mounted in the guide groove 11 of the tip retaining section 10b of the cutter holder 5, the optical fiber 20 is retained by closing the cutter holder 4 and by fitting the tip retaining section 10a to the tip retaining section 10b.

Here, the optical fiber 20 positioned by the guide groove 11 is heated to the temperature at which the optical fiber 20 does not melt by the heating device via the heating plate, and then the covering layer is softened.

Next, the support member 2 and the fiber holder retainer 3 are clamped, and then the optical fiber 20 is positioned by the tip retaining section 10a of the cutter holder 4, the tip retaining section 10b of the cutter holder 5, and the guide groove 11 on the tip retaining section 10b. In this condition, only the covering layer of the optical fiber 20 is incised by the first cable covering removing cutter 8 and the second cable covering removing cutter 9.

Next, while maintaining the support member 2 and the fiber holder retainer 3 clamped, the fiber holder retainer with the fiber holder 14 are moved away from the support member 2 along the guide bars 18 and 18 until the end of the optical fiber 20 moves away from first cable covering removing cutter 8 and the second cable covering removing cutter 9. Then, because the movement of the covering layer between the tip and the incising position is limited by the first cable covering removing cutter 8 and the second cable covering removing cutter 9, the covering layer is cut at the incising position, and the bare fiber 20a is extracted from the covering layer, and thus the covering layer is removed as a result.

As explained above, in such an optical fiber cable covering removing device, the removing operation of the covering layer must be performed while the support member 2 and the fiber holder retainer 3 are clamped.

In such an optical fiber cable covering removing device, there was a problem that when extracting the optical fiber 20 through the first cable covering removing cutter 8 and the second cable covering removing cutter 9, the seizing force on the optical fiber by these cable covering removing cutters was insufficient, and thus the removal of the covering layer was insufficient.

Also, there was a problem in that when extracting the optical fiber 20 through the first cable covering removing cutter 8 and the second cable covering removing cutter 9, the clamping force on the fiber holder retainer 3 was insufficient, and thus the optical fiber 20 could not be extracted from the support member 2 due to the slipping in the fiber holder 14.

Particularly, in the case in which the optical fiber is a multiple type of optical fiber tape, and in the case in which a number of the optical fibers is increased, and in the case in which the clamping force exerted by an operator is weak, such problems tend to occur.

The present invention was made in view of the above situation, and an object of present invention is to provide an optical fiber cable covering removing device which can remove the covering layer of an optical fiber reliably and safely.

SUMMARY OF THE INVENTION

The above problems can be solved by an optical fiber cable covering removing device having a support member having a pair of freely opening and closing cutter holders provided with cable covering removing cutters which remove the covering layer of the optical fiber and being provided with a cutter holder fixing structure which fixes the cutter holder in a closed position, a fiber holder which can freely open and close and retains the optical fiber, a fiber holder retainer which can move the fiber holder toward and away from the support member along longitudinal direction of the optical fiber.

The cutter holder fixing structure should preferably impart fixing force parallelly to the cable covering removing cutter provided on the cutter holder.

The fiber holder retainer should preferably be provided with a fiber holder fixing structure which fixes the fiber holder in the closed position.

The fiber holder fixing structure should preferably be disposed near the center of the fiber holder.

The optical fiber cable covering removing device of the present invention has a support member having a pair of freely opening and closing cutter holders having the cable covering removing cutters which remove the covering layer of the optical fiber, and the freely opening and closing fiber holder which retains the optical fiber. In the present invention, the fiber holder retainer which can move the fiber holder toward and away from the support member along longitudinal direction of the optical fiber is provided, and the support member is provided with the cutter holder fixing structure which fixes the cutter holder in the closed position. Therefore, the problem that the seizing force of the cable covering removing cutters to the optical fiber becomes weak, and the removal of the covering layer cannot be done sufficiently when removing the covering layer, does not occur. Also, an operator does not have to clamp the optical fiber cable covering removing device himself in the operation, even in the removing operation of the covering layer of the multiple type of optical fiber with many fibers, thus the removal of the covering layer can be done reliably and safely.

Also, because the cutter holder fixing structure can impart force uniformly in parallel to the cable covering removing cutters formed on the cutter holder, the seizing force on the optical fiber is sufficiently transmitted on the cable covering removing cutters, the removal of the covering layer of the optical fiber can be done satisfactorily.

Furthermore, because the fiber holder retainer is provided with the fiber holder fixing structure which fixes the fiber holder in the closed position, the seizing force on the optical fiber does not become insufficient, and therefore the optical fiber does not slip in the fiber holder, and the optical fiber is not pulled out from the fiber holder. Also, in the removing operation of the covering layer of the multiple type of optical fiber with many fibers, the removal of the covering layer can be performed reliably and safely. Because the fiber holder fixing structure is disposed near the center of the fiber holder, the optical fiber is firmly retained in the fiber holder.

DESCRIPTION OF THE EMBODIMENTS

The present invention is explained in detail as follows.

Figure 1:
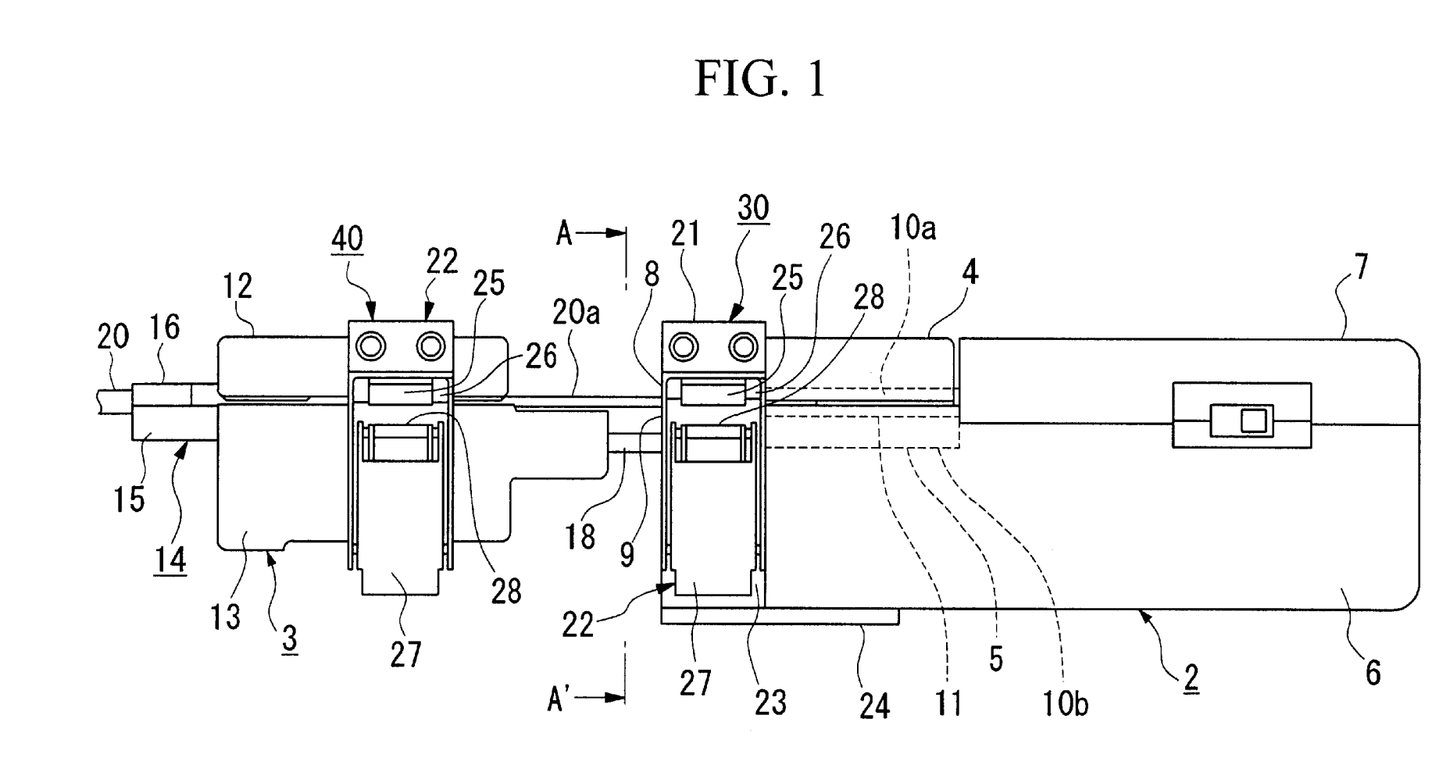
FIG. 1 is a front view showing a first embodiment of the present invention of the optical fiber cable covering removing device.

FIG. 1 is a front view showing a first embodiment of present invention of an optical fiber cable covering removing device. In the following explanations, like reference numerals are attached to like parts as in the above explained conventional optical fiber cable covering removing device, and thus the explanations are omitted.

The optical fiber cable covering removing device in this example generally comprises a support member 2 and a fiber holder retainer 3. The support member 2 is provided with the cutter holder fixing structure 30 which can fix the cutter holders 4 and 5 in the closed position, and the fiber holder retainer 3 provided with the fiber holder fixing structure 40 which can fix the fiber holder 14 in the closed position.

Figure 2:
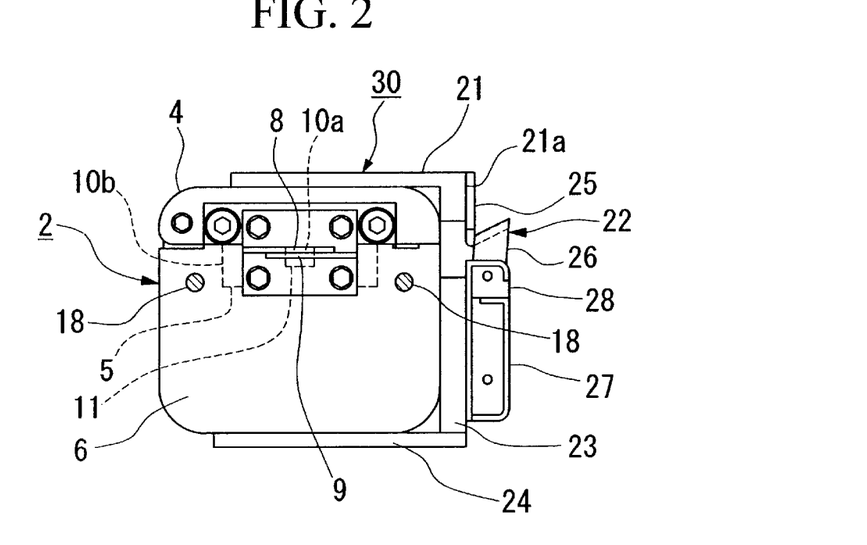
FIG. 2 is a cross section taken along A–A' in FIG. 1.
Figure 3:
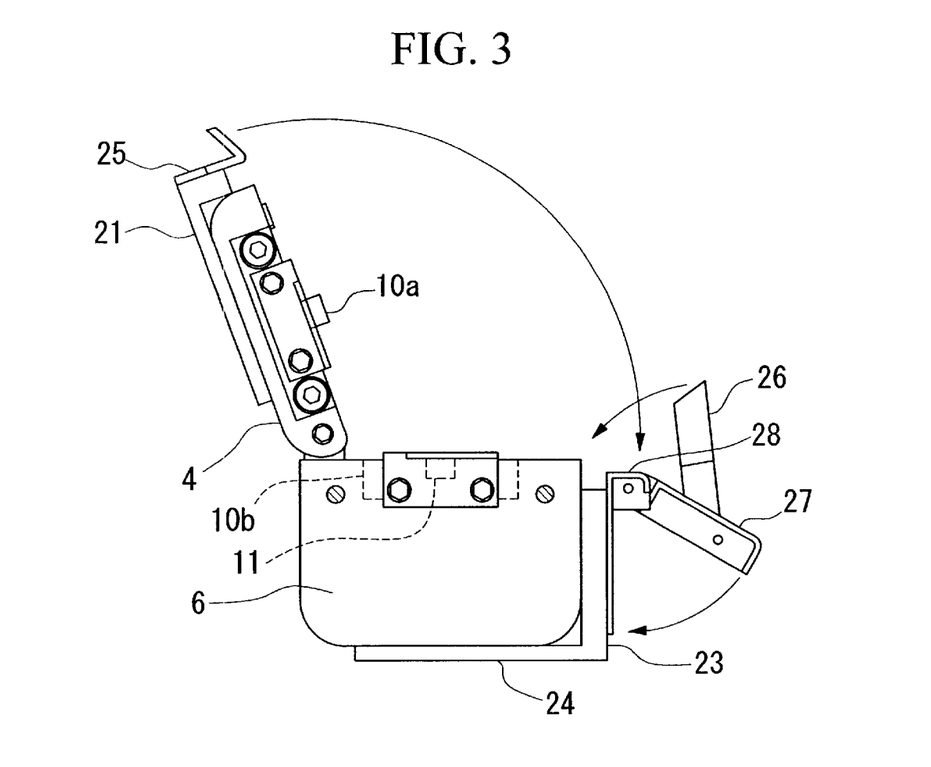
FIG. 3 is a cross section of the cutter holder in the open position by releasing the fixture of the cutter holder fixing structure 30 in FIG. 2.

FIG. 2 is a cross section taken along the line A–A' in FIG. 1. FIG. 3 is a cross section showing the cutter holder 4 in the opened condition by releasing the fixing of the cutter holder fixing structure 30 in FIG. 2.

The cutter holder fixing structure 30 is provided with a L-shaped retaining plate 21 which is attached on the upper surface of the cutter holder 4 perpendicularly to longitudinal direction of the support member 2 and over the shorter dimension of the support member 2, a ratchet 22, a side plate 23 for attaching the base of the ratchet 22 fitted on the side of the main body 6, and a bottom plate 24, the bottom plate attached on the bottom surface of the main body 6 perpendicularly to the longitudinal direction of the main body 6 and over the shorter dimension of the main body 6.

Also the ratchet 22 is provided with a hook shaped receiving member 25 which is attached to the side face 21a of the retaining plate 21, an anchor 26 which is to be fitted to this receiving member 25, an arm 27 attached on this anchor 26 via a spring (not shown in the drawing) provided in the anchor 26 by a pin, and a base 28 attached with this arm 27 by a pin for fixing the ratchet 22 on the side plate 23.

In order to retain the optical fiber 20 on the support member 2, first, the optical fiber 20 is put on the guide groove 11 of the tip retaining member 10b of the cutter holder 5, then the cutter holder 4 is closed, and the tip retaining member 10a is fitted to the tip retaining member 10b. Next, the anchor 26 is fitted to the receiver 25, the anchor is pulled in the lower direction by bringing down the arm 27 to the side face of the main body 6, when the arm 27 closely contacts the base 28, the cutter holder fixing structure 30 is fixed, thus the optical fiber 20 is retained on the support member 2. As explained above, because the anchor 26 and the arm 27 are attached together via a spring, it is possible to keep them away from each other by a short distance. Therefore, the spring expands when fitting the anchor 26 with the receiver 25; however, when the arm 27 closely contacts the base 28, because the spring contracts and generates a force which pulls the retaining plate 21 vertically lower direction, and the cutter holder fixing structure 30 is strongly fixed.

Also, the cutter holder fixing structure 30 should preferably be able to impart fixing force parallel to the first cable covering removing cutter 8 and the second cable covering removing cutter 9. For that structure, the retaining plate 21 which forms the cutter holder fixing structure 30 is disposed in parallel with the first cable covering removing cutter 8 and also directly overhead thereof, the bottom plate 24 is disposed in parallel with the second cable covering removing cutter 9 and also directly beneath thereof. By doing it in this way, the fixing force to the optical fiber 20 is imparted to each cable covering removing cutters in parallel. Unless the force is imparted to the first cable covering removing cutter 8 and the second cable covering removing cutter 9 in parallel, the fixing force for the optical fiber 20 is not transmitted sufficiently to these cable covering removing cutters, and thus the removal of the covering layer of the optical fiber 20 cannot be achieved sufficiently.

Furthermore, the position where the ratchet 22 is disposed should preferably be the opposite to the side where the cutter holder 4 and the main body 6 are attached. By doing so, the cutter holder 4 and the main body 6 can be held tightly by less force. Also, the operation until the optical fiber 20 is fixed on the support member 2 can be facilitated.

Also, the size of the retaining plate 21, the ratchet 22, side plate 23, and the bottom plate 24 is preferably determined according to factors such as the number of the optical fibers 20.

Figure 4:
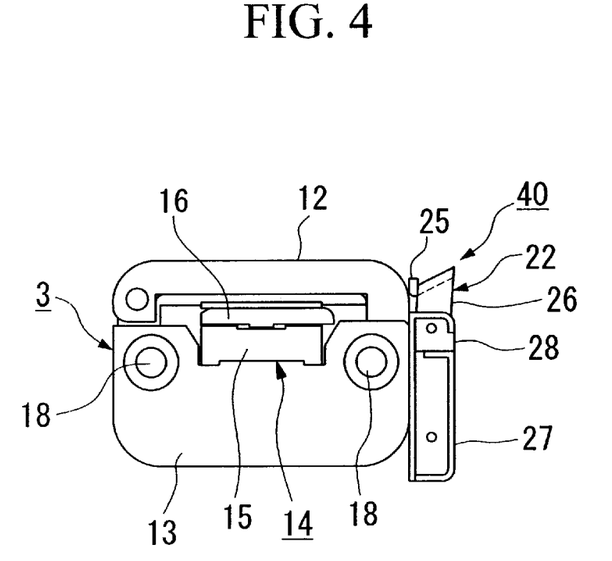
FIG. 4 is a left side view of the fiber holder retainer 3.

Here, FIG. 4 is a left side view of the fiber holder retainer 3. The fiber holder fixing structure 40 provided on the fiber holder retainer 3 comprises the ratchet 22 used in the cutter holder fixing structure 30, this ratchet 22 is directly attached to the side face of the fiber holder retainer 3. Because the optical fiber 20 can be firmly retained on the fiber holder retainer 3 by the fiber holder fixing structure 40, when removing the covering layer of the optical fiber 20 by moving the fiber holder retainer 3 away from the support member 2, the problem that the removal of the covering layer becomes insufficient due to the slip and the deviation of the optical fiber 20 in the fiber holder 14 can be avoided.

The retaining plate 21, the side plate 23, and the bottom plate 24 which are used in the fiber holder fixing structure 30 can be used in the fiber holder fixing structure 40. By such a structure, the fiber holder fixing structure 40 can be fixed with less force when retaining the optical fiber 20.

Also, the fiber holder fixing structure 40 should preferably be disposed near the center in the longitudinal direction of the fiber holder 14 which is retained by the fiber holder retainer 3. By doing so, because the optical fiber 20 is firmly retained by the fiber holder 14, the optical fiber 20 does not slip in the fiber holder 14, and thus the optical fiber 20 is not pulled out from the support member 2.

Furthermore, the position where the ratchet 22 is disposed should preferably be opposite to the side where the retainer upper member 12 and the retainer lower member 13 are attached by a hinge. By doing so, the retainer upper member 12 and the retainer lower member 13 can be pressed with less force. Also, the operation until the optical fiber 20 is fixed in the fiber holder 14 can be smooth. Also, the size of the ratchet 22 is preferably determined according to factors such as the number of the optical fibers 20.

Figure 5:
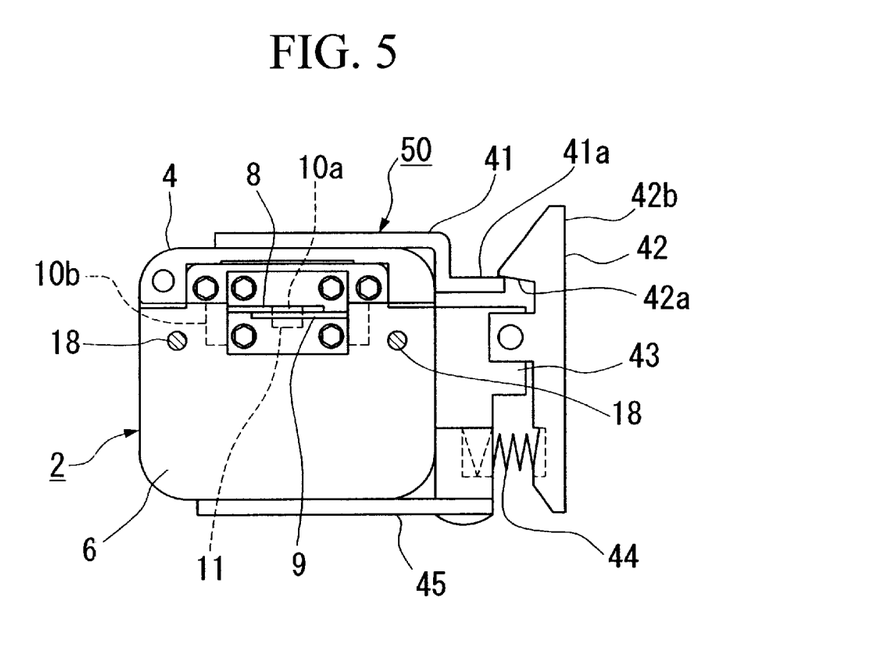
FIG. 5 is a side view showing a second embodiment of the present invention of the optical fiber cable covering removing device.

FIG. 5 is a left side view of the support member 2 showing a second embodiment of the optical fiber cable covering removing device of present invention. In the following explanations, like reference numerals are attached to like parts as in the above first embodiment of the optical fiber cable covering removing device of the present invention, and thus the explanations thereof are omitted.

The support member 2 of the optical fiber cable covering removing device in this embodiment is provided with a cutter holder fixing structure 50 which can fix the cutter holder 4 and 5 in the closed position.

The cutter holder fixing structure 50 comprises a retaining plate 41 being attached on the upper surface of the cutter holder 4 perpendicularly to the longitudinal direction of the support member 2 and over the shorter dimension of the support member 2, and having a projecting section 41a projecting in shorter dimension of the support member 2, an anchor 42 having a taper shaped mouth section 42a of which the cross section becomes gradually larger, a side plate 43 for attaching the anchor 42 attached on the side surface of the main body 6, a spring 44 being inserted in the insert holes formed on the anchor 42 and the side plate 43, a bottom plate 45 attached on the bottom surface of the main body 6 perpendicularly to the longitudinal direction of the main body 6 and over the shorter dimension of the main body 6.

In order to retain the optical fiber 20 on the support member 2, first, the optical fiber 20 is put in the guide groove 11 of the tip retaining section 10b of the cutter holder 5, then the cutter holder is closed, and then the tip retaining section 10a is fitted to the tip retaining section 10b. Next, the side surface of the upper section 42b of the anchor 42 is pressed, the projecting section 41a of the retaining plate 41 is pressed and fixed in the taper shaped mouth section 42a formed on the anchor 42. Because the opening part of the taper shaped opening section 42a becomes gradually smaller towards the inside, by pressing the projecting section 41a more deeply into the opening section 42a, the optical fiber 20 can be firmly retained. At this time, the spring 44 expands in the direction of the shorter dimension of the support member 2, because the spring 44 contracts towards the shorter dimension of the support member 2 to generate a force which pulls the retaining plate 41 perpendicularly to the lower direction after the retaining plate 41 is fixed by the anchor 42, and the cutter holder fixing structure 50 is firmly fixed.

In the case in which the pressing force on the retaining plate 41 is insufficient, by pressing the side surface of the upper part 42b of the anchor 42 by a finger or the like, the pressing force on the retaining plate 41 can be increased by a small force.

Also, the cutter holder fixing structure 50 should preferably be able to impart force in parallel on the first cable covering removing cutter 8 and the second cable covering removing cutter 9 similar to the above cutter holder fixing structure 30. In order to do this, the retaining plate 41 which constitutes the cutter holder fixing structure 50 is disposed in parallel with the first cable covering removing cutter 8 and also directly overhead thereat, and the bottom plate 45 is disposed in parallel with the second cable covering removing cutter 9 and also directly beneath thereat.

Furthermore, the position where the projecting section 41a of the retaining plate 41 and the anchor 42 are provided should preferably be opposite to the side where the cutter holder 4 and the main body 6 are attached together by a hinge. By doing this, the cutter holder 4 and the main body 6 can be pressed with less force. Also, the operation until the optical fiber 20 is fixed on the support member 2 can be smooth.

Also, the size of the retaining plate 41, the anchor 42, the side plate 43, and the bottom plate 45 is preferably determined according to factors such as the number of the optical fibers.

Additionally, this cutter holder fixing structure 50 can also preferably be used as a fiber holder fixing structure.

Figure 6:
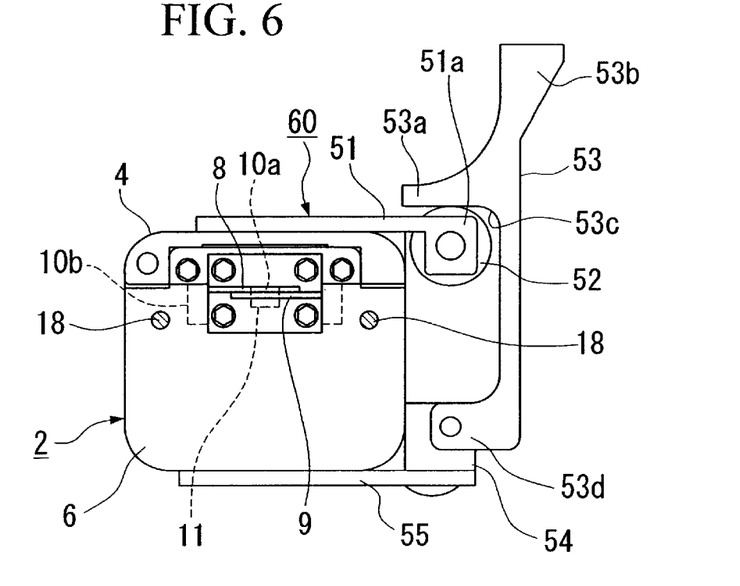
FIG. 6 is a side view showing the third embodiment of the present invention of the optical fiber cable covering removing device.

FIG. 6 is a left side view of the support member 2 showing the third embodiment of the present invention of the optical fiber cable covering removing device.

In the following explanations, like reference numerals are attached to like parts as in the above explained first embodiment of the present invention of the optical fiber cable covering removing device, and thus the explanation is omitted or simplified.

The support member 2 of this example of the optical fiber cable covering removing device is provided with the cutter holder fixing structure 60 which can fix the cutter holders 4 and 5 in the closed position.

The cutter holder fixing structure 60 comprises a retaining plate 51 being attached on the upper surface of the cutter holder 4 perpendicularly to the longitudinal direction of the support member 2 and over the shorter dimension of the support member 2, and having the fixing section 51a for rotatably fixing a roller 52 in the shorter dimension of the support member 2, an anchor 53 having an opening section 53c of which the cross section is nearly C-shaped, a side plate 54 for attaching the anchor 53 attached in the lower direction of the side surface of the main body 6, a bottom surface 55 attached on the bottom surface of the main body 6 perpendicularly to the longitudinal direction of the main body 6 and over the shorter dimension of the main body 6.

In order to retain the optical fiber 20 on the support member 2, first, the optical fiber 20 is put in the guide groove 11 of the tip retaining section 10b of the cutter holder 5, then the cutter holder 4 is closed, and the tip retaining section 10a is fitted in the tip retaining section 10b. Next, a lever 53b of the anchor 53 is seized and pulled to the side surface of the main body 6, and the roller 52 is pressed and fixed in the opening section 53c of the anchor 53. When pressing the roller 52 in the opening section 53c, the retaining plate 51 is elastically deformed, and the force which pulls in perpendicularly lower direction is added, and the cutter holder fixing structure 60 is firmly fixed.

Also, the cutter holder fixing structure 60 should preferably impart a force in parallel to the first cable covering removing cutter 8 and the second cable covering removing cutter 9, similarly to the above cutter holder fixing structure 30. In order to do it in this way, the retaining plate 51 which constitutes the cutter holder fixing structure 60 is disposed in parallel with the first cable covering removing cutter 8 and also directly overhead thereat, and the bottom plate 55 is disposed in parallel with the second cable covering removing cutter 9 and also directly beneath thereat.

Furthermore, the position where the roller 52 and the anchor 53 are disposed should preferably be opposite to the side where the cutter holder 4 and the main body 6 are attached together by a hinge. By doing this, the cutter holder 4 and the main body 6 can be pressed with less force. Also, the operation until the optical fiber 20 is fixed on the support member 2 can be smooth.

Also, the size of the retaining plate 51, the roller 52, the anchor 53, the side plate 54 and the bottom plate 55 is preferably determined according to factors such as the number of optical fibers.

Additionally, this cutter holder fixing structure 60 can also preferably be used as a fiber holder fixing structure.

Figure 7:
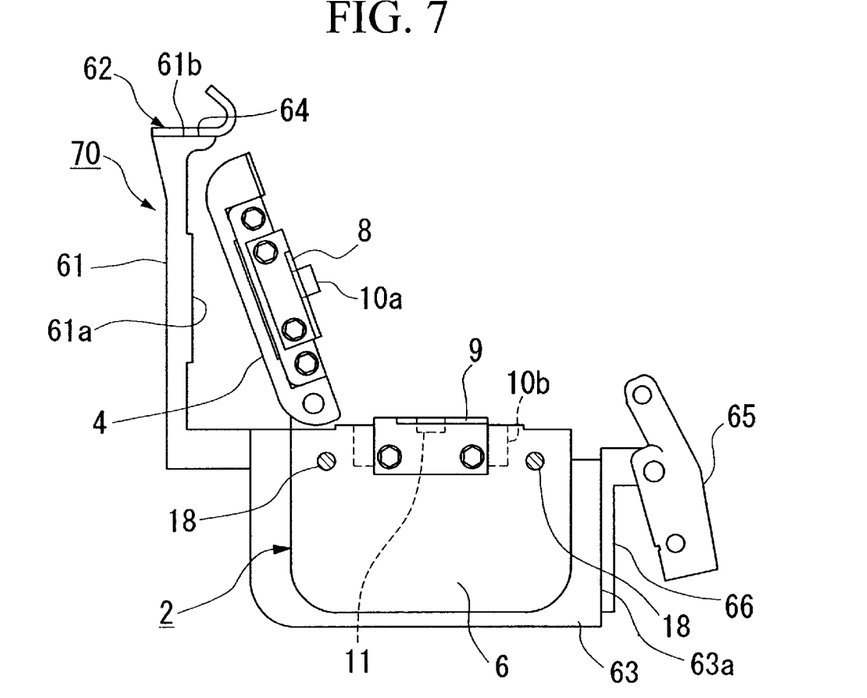
FIG. 7 is a side view showing the fourth embodiment of the present invention of the optical fiber cable covering removing device.

FIG. 7 is a left side view of the support member 2 showing the fourth embodiment of the present invention of the optical fiber cable covering removing device.

In the following explanations, like reference numerals are attached to like parts as in the above first embodiment of the optical fiber cable covering removing device of the present invention, and thus the explanation thereof is omitted.

The support member 2 of the optical fiber cable covering removing device in this example is provided with a cutter holder fixing structure 70 which can fix the cutter holder 4 and 5 in the closed position.

The cutter holder fixing structure 70 comprises a nearly C-shaped retaining plate 61 which is to be fitted from the upper surface side of the cutter holder 4 to the upper surface and a part of both side surfaces of the cutter holder 4, a ratchet 62, a nearly C-shaped casing 63 which is to be fitted from the bottom surface side of the main body 6 to the bottom surface and a part of both side surfaces of the main body 6.

Also, the retaining plate 61 and the casing 63 are attached together by a hinge.

Also, the ratchet 62 comprises a hook-shaped receiver 64 which is attached on the side surface 61b of the retaining plate 61, an anchor 65 which is to be fitted to this receiver 64, and a base 66 being attached to this anchor 65 by a pin to fix the ratchet 62 on the side surface 63a of the casing 63.

In order to retain the optical fiber 20 on the support member 2, first, the casing 63 is fitted on the main body 6 from the bottom surface side of the main body 6. Next, the optical fiber 20 is put in the guide groove 11 of the tip retaining section 10b of the cutter holder 5, then the cutter holder 5 is closed, and the tip retaining section 10a is fitted to the tip retaining section 10b. Next, the retaining plate 61 is closed and fitted to the cutter holder 4. Next, the anchor 65 is fitted to the receiver 64, the receiver 65 is brought down to the side of the main body 6, and the receiver 64 is pulled to the lower direction, when the anchor 65 contacts the base 66 closely, the cutter holder fixing structure 70 is fixed, and thus the optical fiber 20 is retained on the support member 2. Because this cutter holder fixing structure 70 presses the support member 2 peripherally, uniform force can be imparted, and therefore few structural defects occur.

Also, by fixing the cutter holder fixing structure 70, because the projecting section 61a formed on the surface contacting the cutter holder 4 of the retaining plate 61 presses the cutter holder 4 from the upper surface side, the cutter holder fixing structure 70 is firmly fixed.

Also, the cutter holder fixing structure 70 should preferably be able to impart a force in parallel on the first cable covering removing cutter 8 and the second cable covering removing cutter 9 similarly to the above cutter holder fixing structure 30. In order to do this, the retaining plate 61 constituting the cutter holder fixing structure 70 is disposed in parallel with the first cable covering removing cutter 8 and also directly overhead thereat, the bottom of the casing 63 is disposed in parallel with the second cable covering removing cutter 9 and also directly beneath thereat.

Furthermore, the position where the ratchet 62 is provided should preferably be opposite to the side where the cutter holder 4 and the main body 6 are attached together by a hinge. By doing this, the cutter holder 4 and the main body 6 can be pressed with less force. Also, the operation until the optical fiber 20 is fixed on the support member 2 can be smooth.

Also, the size of the retaining plate 61, the ratchet 62, and the casing 63 is preferably determined according to factors such as the number of optical fibers.

Additionally, this cutter holder fixing structure 70 can also preferably be used as a fiber holder fixing structure.

The force required for the cutter holder fixing structures 30, 50, 60, and 70 to press the support member 2 is, in the case in which the optical fiber 20 is an optical fiber tape having 24 fibers, 13 kg-f or more in parallel with the first cable covering removing cutter 8 and the second cable covering removing cutter 9, and more preferably between 13 to 15 kg-f. In case in which the force is less than 13 kg-f, when extracting the optical fiber 20 through the first cable covering removing cutter 8 and the second cable covering removing cutter 9 to remove the covering layer, the force of the cutter holder fixing structure for putting these cable covering removing cutters in between becomes weak, thus the removal of the cable cover is not performed sufficiently.

Also, the force required for the fiber holder fixing structure 40 to press the fiber holder retainer 3 is, in the case in which the optical fiber 20 is an optical fiber tape having 24 fibers, 15 kg-f or more in parallel with nearly the center of the longitudinal direction of the fiber holder 14, and more preferably between 15 to 17 kg-f. In case in which the force is less than 15 kg-f, the force of the fiber holder fixing structure 40 for putting the fiber holder 14 becomes weak, thus the optical fiber 20 slips in the fiber holder 14, therefore, the optical fiber 20 may be extracted from the support member 2.

The optical fiber cable covering layer removing method by the above optical fiber cable covering removing device is explained with reference to the FIGS. 1 and 2 as follows.

First, keeping both opening and closing members 16 and 16 of the fiber holder 14 opened against the base stand 15, the optical fiber 20 is put on the base stand 15, then both opening and closing members 16 and 16 are closed, and the one end of the optical fiber 20 is made to project from the fiber holder 14.

Next, the anchor 26 is fitted to the receiver 25 of the fiber holder fixing structure 40, then the arm 27 is brought down to the side surface of the main body 6, the anchor 26 is pulled in the lower direction, the arm 27 contacts the base 28 closely, the fiber holder fixing structure 40 is fixed, and thus the optical fiber 20 is fixed on the support member 2.

Next, the optical fiber 20 is put in the guide groove 11 of the tip retaining section 10b of the cutter holder 5, the cutter holder 4 is closed, the tip retaining section 10a is fitted to the tip retaining section 10b, and thus the optical fiber 20 is retained.

Here, the optical fiber 20 which was positioned in the guide groove 11 is heated to a temperature at which the optical fiber 20 does not melt by the heating device via the heating plate, and thus the covering layer is softened.

Next, the anchor 26 is fitted to the receiver 25 of the cutter holder fixing structure 30, then the arm 27 is brought down to the side surface of the main body 6, the anchor 26 is pulled to the lower direction, the arm 27 contacts the base 28 closely, the cutter holder fixing structure 30 is fixed, and thus the optical fiber 20 is fixed on the support member 2. By doing this, the optical fiber 20 is positioned by the tip retaining section 10a of the cutter holder 4, the tip retaining section 10b of the cutter holder 5, and the guide groove 11 of the tip retaining section 10b, in this condition, only the covering layer of the optical fiber 20 is incised by the first cable covering removing cutter 8 and the second cable covering removing cutter 9.

Next, while maintaining the support member 2 and the fiber holder retainer 3 fixed, the fiber holder retainer 3 together with the fiber holder 14 is moved away from the support member 2 along the guide bars 18 and 18 until the end of the optical fiber 20 moves away from the first cable covering removing cutter 8 and the second cable covering removing cutter 9. Accordingly, because the movement of the covering layer towards the tip from the above incising position is limited by the first cable covering removing cutter 8 and the second cable covering removing cutter 9, the covering layer is incised at the incising position, and the bare fiber 20a is extracted from the covering layer, and thus the covering layer is removed.

What is claimed is:

1. An optical fiber cable covering removing device comprising:

a support member having a pair of freely opening and closing cutter holders provided with cable covering removing cutters which remove the covering layer of an optical fiber;

a fiber holder retainer having a freely opening and closing fiber holder which retains the optical fiber, and the fiber holder retainer being able to move the fiber holder toward and award from the support member along the longitudinal direction of the optical fiber;

wherein the support member is provided with a cutter holder fixing structure which fixes the cutter holder in the closed position;

the cable covering removing cutters are fixed on each of the cutter holders; and the cutter holder fixing structure applies a cutting force in a direction orthogonal to the longitudinal direction of a cutting edge of the cable covering removing cutters.

2. An optical fiber cable covering removing device according to claim 1, wherein the cutter holder fixing structure imparts force in parallel against the cable covering removing cutters provided in the cutter holder.

3. An optical fiber cable covering removing device according to claim 1, wherein the fiber holder retainer is provided with the fiber holder fixing structure which fixes the fiber holder in the closed position.

4. An optical fiber cable covering removing device according to claim 3, wherein the fiber holder fixing structure is disposed near the center of the fiber holder.

5. An optical fiber cable covering removing device according to claim 1, wherein a force required for the cutter holder fixing structure to press the support member is 13 to 15 kg-f in parallel with a first cable covering removing cutter and a second cable covering removing cutter of the cable covering removing cutters.

6. An optical fiber cable covering removing device according to claim 1, wherein a force required for the cutter holder fixing structure to press the fiber holder retainer is 15 to 17 kg-f in parallel with the longitudinal direction of the fiber holder.

* * * * *